Irwin R. Barr
INVENTOR

BY
ATTORNEY 3,550,210
APPARATUS FOR MOLDING ARTICLES
Irwin R. Barr, Lutherville, Md., assignor to AAI Corporation, Cockeysville, Md., a corporation of Maryland
Filed Dec. 26, 1967, Ser. No. 693,573
Int. Cl. B29c 1/00
U.S. Cl. 18—34                                                7 Claims

ABSTRACT OF THE DISCLOSURE

A molding arrangement is disclosed for molding tubular shaped articles or articles having a bore extending therethrough. The arrangement includes a mold unit having a cavity formed therein, and a core removably extending through the center of the cavity, with a core tang extending within an axially movable valve rod which is concentric with the core and core tang and with the injection nozzle in which it moves. The core tang seals the valve rod bore preparatory to injection, and provides a ring shaped gate opening through which the settable liquid charge may be injected into the mold cavity. This axial concentric ring injection prevents formation of longitudinal weld lines, and the core tang and this method of injection also prevent formation of a flash sheet across the desired central opening defined by the core.

---

This invention relates to molding apparatus, particularly sprueless molding apparatus in which an article, such as a sabot, is formed with a central bore therethrough.

Molding machines are now conventional, both sprueless and otherwise, which enable the formation of an article with a central bore extending therethrough. However, to my knowledge, in prior molding apparatus and methods, including sprueless types, flash is frequently formed across the desired central bore, and also one or more longitudinal weld lines are formed in the castings as the result of off-center injection.

It is an object and feature of the present invention to provide a molding arrangement, and particularly a sprueless molding arrangement and method for molding articles having a central bore, in which formation of flash across the central bore is obviated, and in which weld lines are also obviated.

Briefly according to this invention these objects and features are achieved by feeding the desired settable casting liquid coaxially of and about the desired central opening, this opening being defined by a central core having a tang slidably engaged by a valve rod having a coaxial bore therein complementary to the core tang.

Still other objects, features and attendant advantages will become apparent from a reading of the following detailed description of an illustrative embodiment and mode of practice according to the invention, taken in conjunction with the accompanying drawings, wherein.

Figure 1:
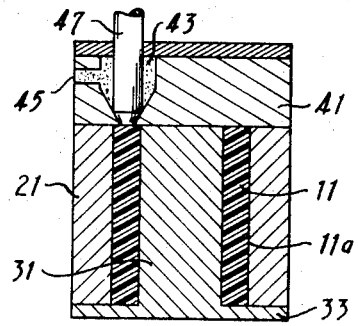
FIG. 1 is a rudimentary section view of a prior art mold arrangement.
Figure 2:
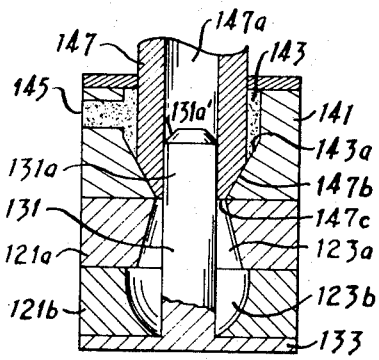
FIG. 2 is a section view of a mold arrangement according to the present invention, showing the mold in ready condition preparatory to injection of a charge.
Figure 3:
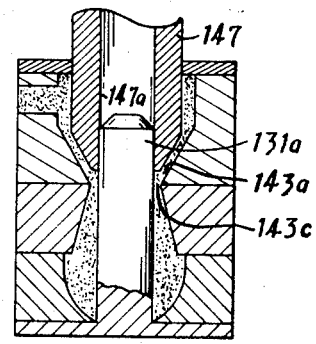
FIGS. 3 and 4 are section views similar to FIG. 2, respectively illustrating the injection feeding position of the flow-control valve rod and the closed position of the valve rod after completion of injection.

Referring now in detail to the figures of the drawing, in a presently employed prior art arrangement as shown in FIG. 1 a tubular casting 11 is formed in a mold having a mold plate 21, a core plate 33 and central cylindrical core 31, the mold plate 21 and core 31 about the face of the gate or nozzle plate 41 the tubular mold cavity for the cast part 11 being bounded at one end by the nozzle plate 41 and at the other end by plate 33. Settable liquid casting material is injected into the cavity off-center of the cavity through one or more gates 43 disposed at one or more circumferential end position of the cavity, the flow of liquid charge into the cavity being controlled by a valve rod 47. This arrangement and method permit formation of flash along the interface between core 31 and plate 41, and the off-center feeding causes the formation of one or more longitudinal weld lines 11a in the cast article 11, depending on the number of feed nozzle gates 43.

In the arrangement according to the present invention and as shown generally schematically in FIGS. 2–5, an article, in the form of a sabot 111, having a central cylindrical bore formed therein, is cast by injecting a charge of settable liquid casting material under pressure through a feed conduit 145 and gate 143 coaxially into a unitary sabot cavity 123a, 123b formed in two separable mold plates 121a, 121b.

Flow of material through gate 143 is controlled by a valve rod 147 coaxial with the mold cavity and having a central coaxial bore 147a formed therein.

Extending longitudinally through the center of the mold cavity 123a, 123b is a cylindrical core 131, which may be secured to or integral with an end plate 133. Core 131 has a tang 131a which extends beyond the mold cavity 123a, 123b and into removable sliding complementary sealing relation with valve rod bore 147a, thereby defining a central cylindrical zone from which the charge of material is excluded along the entire length of the cavity 123a, 123b for the sabot casting 111.

Valve rod 147 has a frusto-conical seat end 147b which mates in sealing relation with a complementarily tapered nozzle seat 143a to close the cavity upon completion of filling or preparatory to filling of the cavity with a charge of liquid casting material. The core 131 and core tang 131a are of smaller diameter than the exit orifice 143c from the nozzle gate 143, the exit orifice 143c in conjunction with the core 131 and core tang 131a forming a ring orifice through which the casting liquid is concentrically injected into the cavity about the periphery of coaxial core 131. The disposition of core tang 131a within complementary valve rod bore 147a and the concentric axial injection of the casting liquid into the cavity 123a, 123b serve to prevent flash across the desired cylindrical bore in the sabot casting 111, and to obviate weld lines in the casting as the liquid flows axially and substantially simultaneously along all sides toward the forward end of the cavity.

Figure 4:
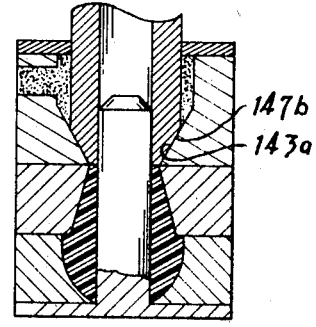
Figure 5:
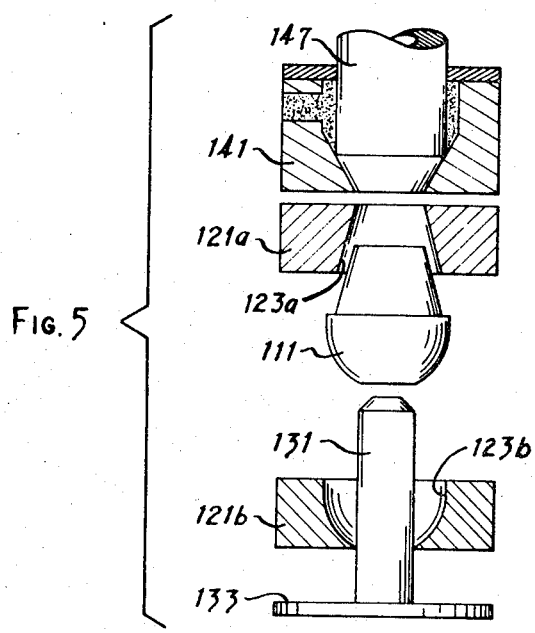
FIG. 5 is a view of the mold parts illustrating removal of the casting from the mold.

Upon completion of filling of the mold cavity with a charge of settable liquid casting material, the valve rod 147 is reseated against nozzle seat 143a, thereby separating the supply liquid from the injected liquid charge by the distance of the interface contact zone by valve rod seat end 147b along tapered seat 143a, as seen in FIG. 4, and the small diameter transverse end face 147c of valve rod 147 forms the rear end face of the sabot cavity. After setting of the liquid charge in the mold cavity, the mold plates 121a, 121b and core 111 are separated as illustrated in FIG. 5, and the sabot casting 111 is removed. Thereupon the mold plates and core may be reunited and the cycle repeated.

It will be apparent that various settable casting materials may be used, such as thermoplastic or thermosetting resins, chemically settable liquids, and metals, and dependent upon the casting material various ancillary heating and/or cooling means may be provided by one skilled in the art, in conjunction with the illustrated molding arrangement. However, as such means are common and well known in the art and do not form a part of the invention per se, such is not shown herein.

As it will be apparent to those skilled in the art that various modifications and improvements may be made by one skilled in the art without departing from the scope and spirit of the invention, it is to be understood that the invention is not to be limited by the illustrative embodiment and specific method, but only by the scope of the appended claims.

That which is claimed is:

1. Apparatus for molding tubular shaped articles or articles having a bore therethrough, comprising:
   a mold unit having a cavity formed therein for receiving liquid material and forming a desired external casting configuration on setting of the material to a solid state,
   a core removably extending through the central region of said cavity and having a core tang extending beyond said cavity,
   a gate member having a gate opening formed therein substantially coaxial with said core,
   a valve member longitudinally movably disposed in selective flow controlling relation in said gate opening and having a central opening formed therein removably receiving and engaging in longitudinally sliding relation with said core tang along its longitudinal operative motion extent.

2. Apparatus according to claim 1,
   said mold unit including multiple plates having coaxial differently configured fluid-interconnected cavity sections.

3. Apparatus according to claim 2,
   said cavity sections being oppositely tapered and forming the external configuration for a projectile sabot having a shoulder formed at the part line of said cavity sections.

4. Apparatus according to claim 1,
   said mold unit cavity having an entrance opening contiguous, coextensive, and connecting with said gate opening,
   said gate opening having a frusto-conical valve rod seat,
   said valve member having a frusto-conical end complementary to said valve rod seat and selectively engageable in seated relation with said frusto-conical valve rod seat.

5. Apparatus for molding tubular shaped articles or articles having a bore therethrough, comprising:
   a mold unit having a cavity formed therein for receiving liquid material and forming a desired external casting configuration on setting of the material to a solid state,
   a core removably extending through the central region of said cavity and having a core tang extending beyond said cavity,
   a gate member having a gate opening formed therein substantially coaxial with said core,
   a valve rod movably disposed in selective flow control relation in said gate opening and having a central opening formed therein removably receiving said core tang,
   said mold unit cavity having an entrance opening contiguous, coextensive, and connecting with said gate opening,
   said gate opening having a frusto-conical valve rod seat,
   said valve rod having a frusto-conical end complementary to said valve rod seat and selectively engageable in seated relation with said frusto-conical valve rod seat,
   said frusto-conical valve rod end having a reduced diameter transversely extending end face disposed radially inward of said seat-engageable frusto-conical end and forming an end face for said mold cavity in the zone extending between the annular edge of said frusto-conical seat and said core.

6. Apparatus according to claim 5,
   said core tank having a tapered guide end connecting with a substantially constant diameter main core section, said tapered guide end aiding in aligned entry of said core tank into said valve rod central opening.

7. Apparatus according to claim 1,
   said core tang being of a length to extend substantially further within said valve member opening than the extent of normal travel of said valve rod for flow cut-off and flow-enablement, said core tang remaining within said valve rod opening in both cut-off and normal flow-enablement positions of said valve rod.

References Cited

UNITED STATES PATENTS

| 2,301,338 | 11/1942 | Smith | 18—Core Digest |
| 2,456,423 | 12/1948 | Jobst | 164—304 |
| 2,471,148 | 5/1949 | Gale et al. | 18—30WI |
| 3,109,201 | 11/1963 | Dulmage | 18—30WCX |

J. SPENCER OVERHOLSER, Primary Examiner

M. O. SUTTON, Assistant Examiner

U.S. Cl. X.R.

18—30